(12) United States Patent
Lee et al.

(10) Patent No.: US 12,734,948 B2
(45) Date of Patent: Sep. 15, 2026

(54) CONSOLE TABLE APPARATUS FOR A VEHICLE

(71) Applicants: HYUNDAI MOTOR COMPANY, Seoul (KR); KIA CORPORATION, Seoul (KR); NIFCO KOREA INC., Anyang-si (KR); ECOPLASTIC CORPORATION, Gyeongju-si (KR)

(72) Inventors: Young Beom Lee, Bucheon-si (KR); Min Chul Yoon, Gwangju-si (KR); Won Young Bae, Seoul (KR); Hyo Jin Shin, Hwaseong-si (KR); Won Sang Cho, Anyang-si (KR); Dong Jin Park, Gyeongju-si (KR); Ui Seong Choi, Gyeongju-si (KR)

(73) Assignees: HYUNDAI MOTOR COMPANY, Seoul (KR); KIA CORPORATION, Seoul (KR); NIFCO KOREA INC., Asan-si (KR); ECOPLASTIC CORPORATION, Gyeongju-si (KR)

( * ) Notice: Subject to any disclaimer, the term of this patent is extended or adjusted under 35 U.S.C. 154(b) by 392 days.

(21) Appl. No.: 18/525,299

(22) Filed: Nov. 30, 2023

(65) Prior Publication Data

US 2025/0010780 A1 Jan. 9, 2025

(30) Foreign Application Priority Data

Jul. 3, 2023 (KR) ........................ 10-2023-0085689

(51) Int. Cl.
*B60N 3/00* (2006.01)

(52) U.S. Cl.
CPC .................................... *B60N 3/001* (2013.01)

(58) Field of Classification Search
CPC ...................................................... B60N 3/001
See application file for complete search history.

(56) References Cited

U.S. PATENT DOCUMENTS

| | | | | |
|---|---|---|---|---|
| 960,213 A * | 5/1910 | Williams | A47B 5/06 108/48 |
| 2,843,436 A * | 7/1958 | Franks | A47B 5/04 108/134 |
| 8,763,976 B1 * | 7/2014 | Jachim | B41J 29/04 248/442.2 |
| 9,414,670 B2 * | 8/2016 | Bo | A47B 3/002 |
| 10,709,235 B1 * | 7/2020 | Brown | A47B 5/04 |
| 11,008,103 B1 * | 5/2021 | Malecha | B64D 11/00152 |
| 11,712,989 B2 * | 8/2023 | Diephuis | B60R 11/0235 296/75 |

(Continued)

FOREIGN PATENT DOCUMENTS

KR 101926382 B1 12/2018

*Primary Examiner* — Taras P Bemko
(74) *Attorney, Agent, or Firm* — Lempia Summerfield Katz LLC

(57) ABSTRACT

A console table apparatus for a vehicle includes a first link module configured to selectively slide along a table, which can be drawn out from a console for a vehicle and positioned in an in use state and can be switched to a stored state. The console table apparatus also includes a second link module configured to support the first link module in the in use state and to selectively release a locking state as the table is switched to the stored state. The second link module is stored inside the console together with the first link module in the stored state.

13 Claims, 7 Drawing Sheets

(56) References Cited

U.S. PATENT DOCUMENTS

| | | | | |
|---|---|---|---|---|
| 2019/0315259 | A1* | 10/2019 | Lee | B60N 3/002 |
| 2019/0320791 | A1* | 10/2019 | Yen | A47B 77/10 |
| 2022/0194284 | A1* | 6/2022 | Woerz | B64D 11/0638 |
| 2024/0424992 | A1* | 12/2024 | Nomoto | B60N 3/101 |

* cited by examiner

CONSOLE TABLE APPARATUS FOR A VEHICLE

CROSS-REFERENCE TO RELATED APPLICATION

This application claims under 35 U.S.C. § 119(a) the benefit of priority to Korean Patent Application No. 10-2023-0085689 filed on Jul. 3, 2023, the entire contents of which are incorporated herein by reference.

BACKGROUND

(a) Technical Field

The present disclosure relates to a console table apparatus for a vehicle. More specifically, the present disclosure relates to a console table apparatus for a vehicle capable of providing convenience to a user by simplifying a supporting and fixing structure.

(b) Discussion of Background

In general, various convenience devices are installed inside a vehicle for the convenience of both a driver and passengers. These convenience devices may include, for example, a console box to store various items, an armrest for a passenger to put an arm on, a cup holder to store beverage containers such as a can, a bottle, or a cup, a glove box installed at a position of a crash pad in front of a passenger's seat, and the like.

In addition, a tray is installed on the crash pad instead of the glove box, or a separate tray is installed on the glove box. Additionally, an electronic device holder, suitable for accommodating devices such as smartphones, multimedia devices, or other miscellaneous objects, is also installed in front of the console box.

The console box is a storage device installed in a space between a driver's seat and a passenger's seat to store documents, articles, tools, or the like. A console armrest to allow a driver to place an arm thereon during driving is installed on an upper portion of the console box. The console armrest serves to assist the driver in driving in a comfortable posture by supporting the driver's elbow and also serves as a lid covering a storage space of the console box.

In addition, luxury vehicles such as a limousine may have adjustable positions of rear seats or angles of seatbacks. Luxury vehicles may also have adjustable positions of front seats or angles of seatbacks to maximally provide convenience to VIP passengers seated in the rear seat of the vehicle so that the passengers may be comfortably seated in a spacious and comfortable space while on board the vehicle.

In addition, various convenience devices may be provided to promote convenience of the passengers in the rear seat of the vehicle. For example, a rear seat console may be installed between the left and right seats of the rear seat, and various convenience devices may be installed in the rear seat console.

For example, a folding console table that may be conveniently used by the passengers sitting on the left and right seats of the rear seat of a vehicle may enable easy manipulation of a switch of the console box or the like regardless of the positions of the left or right seat passengers.

However, recently, the development of rear seat consoles has shifted focus to considering emotional aspects such as design, material, and color to realize a sense of luxury and increase passenger convenience. As a result, foldable console tables are being developed considering functionality, usability, convenience, design, and the like.

SUMMARY

The present disclosure is directed to providing a console table apparatus for a vehicle. For example, by fixing or releasing the fixing of a locking link formed in a two-joint link structure in connection with an operation motion according to the use or storage of a console table, it is possible to increase the convenience of a user that fixes or releases the fixing of the console table. Also, it is not necessary to apply a separate button structure for this, thereby simplifying a configuration of the console table.

A console table apparatus for a vehicle according to the present disclosure includes a first link module configured to selectively slide along a table that can be drawn out from a console of a vehicle and positioned in an in use state and switched to a stored state in the console. The console table apparatus also includes a second link module configured to support the first link module in the in use state and to selectively release a locking state as the table is switched to the stored state. The second link module may be stored inside the console together with the first link module.

The second link module may include a main bracket to which an upper link and a lower link are connected and extend from the console and may include a table link unit rotatably mounted on the main bracket and configured to be connected to the first link module to support the table. The second link module may include a first locking link unit disposed to protrude inside the main bracket and provided to selectively rotate by being pressed by the table link unit. Additionally, the second link module may include a second locking link unit rotated by the first locking link unit and configured to be selectively released from latching of the upper link.

A wedge-shaped pressing member may be positioned in contact with the second locking link unit. The first locking link unit may allow the second locking link unit to be selectively rotated by a shape of the pressing member upon rotating.

In addition, the first locking link unit may be coupled to the main bracket together with an elastic member so that an elastic restoring force acts to allow the first locking link unit to return to an initial position.

The second locking link unit may be positioned by being latched to the upper link through a pair of latching members having shapes corresponding to a respective pair of latching grooves of the upper link.

The second locking link unit may be coupled to the main bracket together with an elastic member so that an elastic restoring force acts to allow the first locking link unit to return to an initial position.

In addition, the second locking link unit may have a latching step between the pair of latching members at which the first locking link unit is positioned to be rotated by pressing the first locking link unit.

The pair of latching members may be formed to be inclined downward from a load pressing direction of the table and positioned by being latched to the pair of latching grooves.

The first link module may include a rail guide coupled to the table to form a slide movement path, and a rail link unit connected to the second link module and configured to slide along the rail guide as the table is switched to the stored state. The first link module also includes a button unit disposed collinearly with the rail link unit to maintain a contact state and configured to block the slide movement path of the rail link unit to fix the table in the in use state.

The button unit may be rotatably mounted on the table and configured to release the locked state by pressing to extend the slide movement path as the table is switched to the stored state upon rotating.

In addition, the button unit may be coupled to the table together with an elastic member so that an elastic restoring force acts to allow the button unit to return to an initial position.

The slide movement path may extend along a space formed between the button unit and the table when the button unit rotates.

The button unit may extend the slide movement path and have a movement guide configured to restrict movement in the space.

According to the present disclosure, by fixing or releasing the fixing of the locking link formed in the two-joint link structure in connection with the operation motion according to use or storage of the console table, it is possible to increase convenience of the user who fixes or releases the fixing of the console table. Also, it is not necessary to apply a separate button structure for this. As a result, the configuration is simplified.

In addition, by applying a structure of the slide rail and the rail link moving along the slide rail and allowing the rail link to move upon pressing of the button to be received in in the space between the button and the console table, the console table can be folded by releasing the fixing of the rail link. Thus, the console table can be easily folded by only the pressing of the button, thereby increasing the user's convenience.

It should be understood that the terms "automotive," "vehicle," "vehicular," or other similar terms as used herein are inclusive of motor vehicles in general. Such motor vehicles may include sports utility vehicles (SUVs), buses, trucks, various commercial vehicles, watercraft including a variety of boats and ships, aircraft, and the like. Such motor vehicles may also include hybrid vehicles, electric vehicles, plug-in hybrid electric vehicles, hydrogen-powered vehicles, and other alternative fuel vehicles (e.g., fuels derived from resources other than petroleum). As referred to herein, a hybrid vehicle is a vehicle that has two or more sources of power, e.g., a vehicle that is both gasoline-powered and electric-powered.

The above and other features of the disclosure are discussed below.

BRIEF DESCRIPTION OF THE DRAWINGS

The above and other features of the present disclosure are described in detail with reference to certain examples thereof illustrated in the accompanying drawings, which are given herein below by way of illustration only, and thus are not limitative of the present disclosure, and wherein.

It should be understood that the appended drawings are not necessarily drawn to scale, and thus presents a somewhat simplified representation of various features illustrative of the basic principles of the disclosure. The specific design features of the present disclosure as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawings.

DETAILED DESCRIPTION

Hereinafter, embodiments according to the present disclosure are described in detail with reference to the accompanying drawings.

Advantages and features of the present disclosure and methods for achieving them should become clearer with reference to the embodiments described below in detail in conjunction with the accompanying drawings.

However, the present disclosure is not limited to the embodiments disclosed below and may be implemented in various different forms. The disclosed embodiments are merely provided to make the disclosure of the technical concepts complete. Furthermore, these embodiments are provided to fully inform those having ordinary skill in the art to which the present disclosure pertains and to aid in providing a complete understanding of the scope of the present disclosure. The present disclosure is only defined by the scope of the appended claims.

In addition, in the description of the present disclosure, where it has been determined that related known technologies may obscure the gist of the present disclosure, a detailed description thereof has been omitted.

When a component, device, element, or the like of the present disclosure is described as having a purpose or performing an operation, function, or the like, the component, device, or element should be considered herein as being "configured to" meet that purpose or perform that operation or function.

When a component is referred to as being "connected" to or "in contact" with another component, it should be understood that it may be directly connected to or in contact with the other component, but other components may exist therebetween. On the other hand, when a component is referred to as being "directly connected" to or "directly in contact" with another component, it should be understood that there is no other component therebetween.

Figure 1:
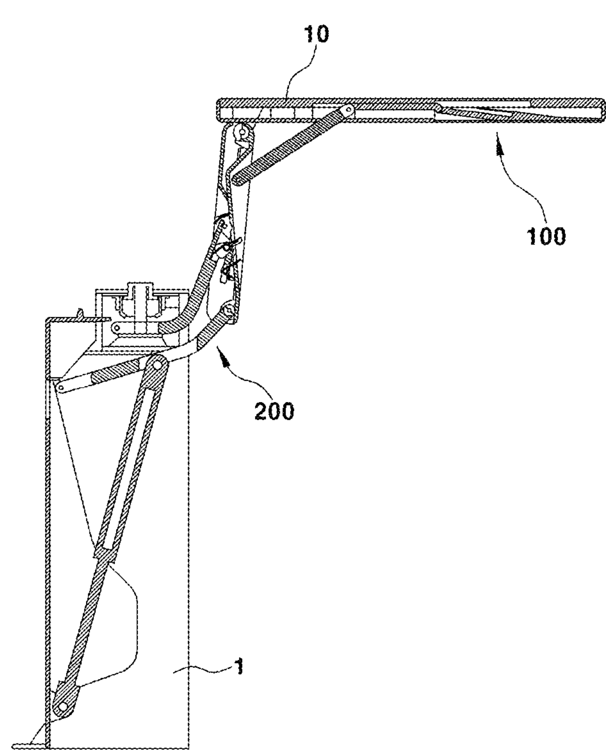
FIG. 1 is a view illustrating a console table apparatus for a vehicle according to an embodiment of the present disclosure.
Figure 2:
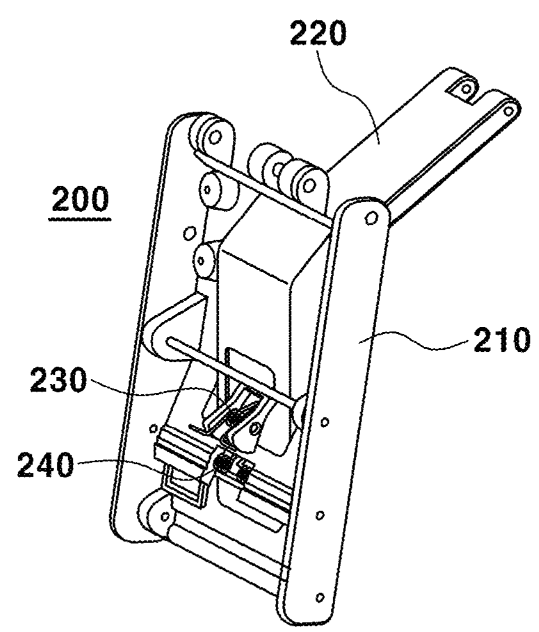
FIG. 2 is a view illustrating an assembled state of a second link module of the console table apparatus for a vehicle according to an embodiment of the present disclosure.
Figure 3:
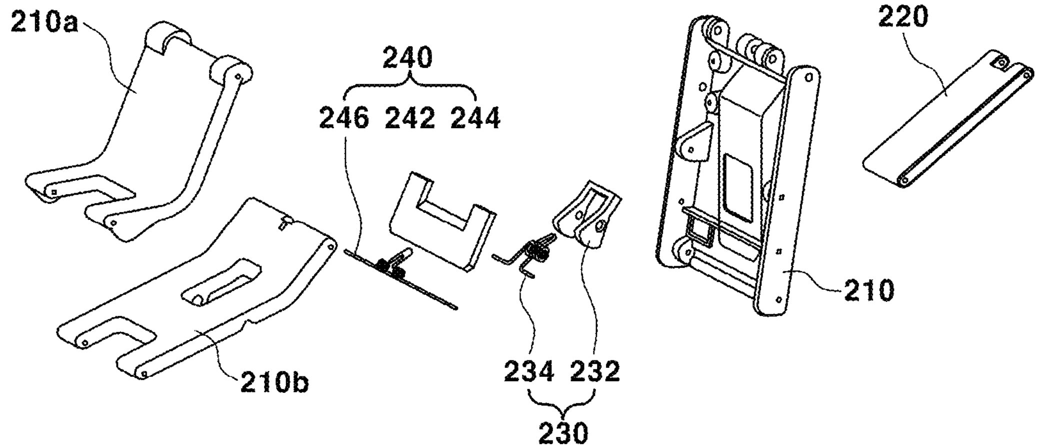
FIG. 3 is a view illustrating an exploded view of the second link module of the console table apparatus for a vehicle according to an embodiment of the present disclosure.

FIG. 1 is a view illustrating a console table apparatus for a vehicle according to an embodiment of the present disclosure. FIG. 2 is a view illustrating an assembled state of a second link module of the console table apparatus for a vehicle according to the embodiment of an present disclosure. FIG. 3 is a view illustrating an exploded view of the second link module of the console table apparatus for a vehicle according to an embodiment of the present disclosure.

Figure 4A:
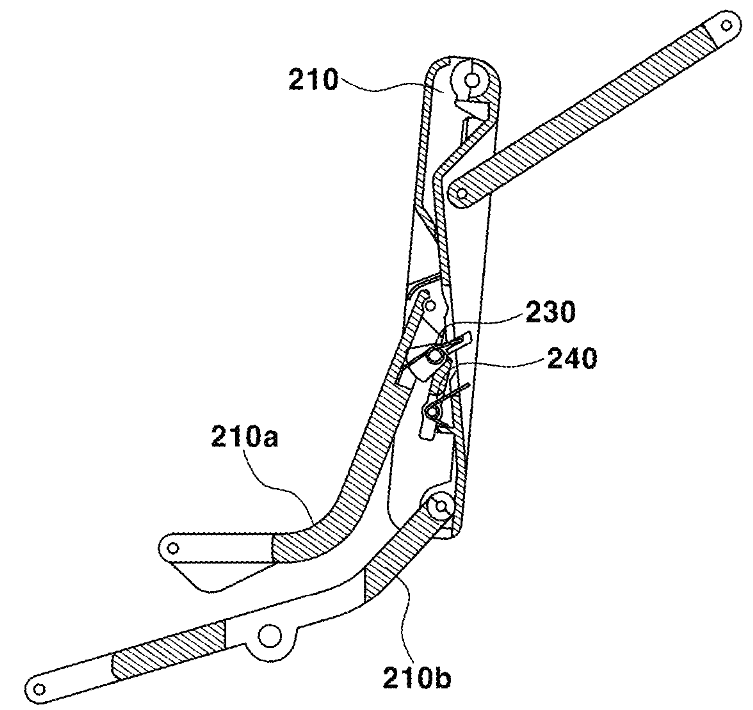
FIGS. 4A and 4B are views illustrating a structure of the second link module of the console table apparatus for a vehicle according to an embodiment of the present disclosure and in an in use state for the table.
Figure 4B:
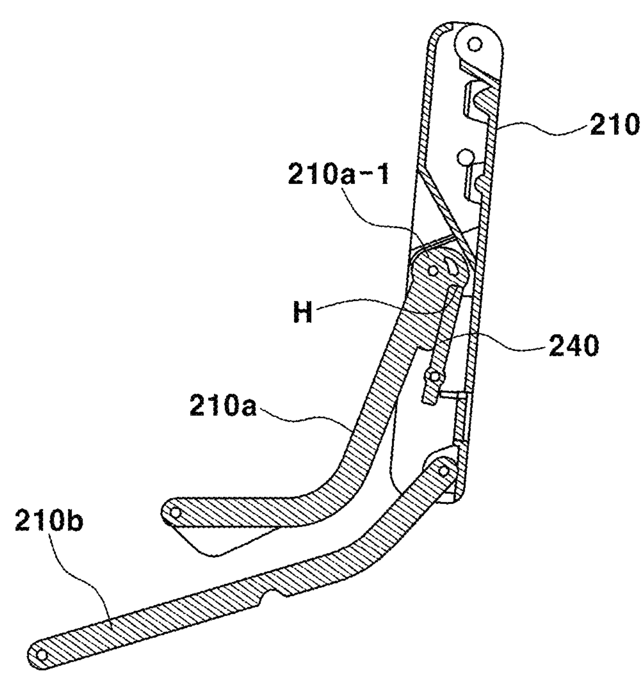
Figure 5A:
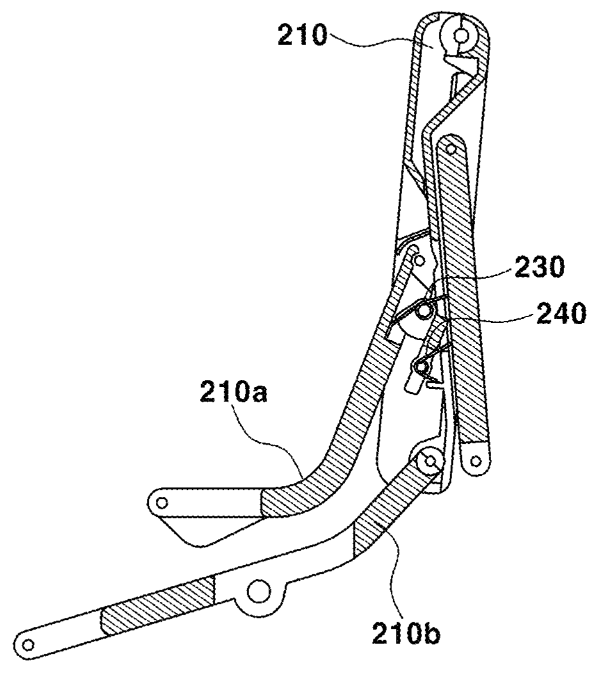
FIGS. 5A and 5B are views illustrating a structure of the second link module of the console table apparatus for a vehicle according to an embodiment of the present disclosure and in a stored state for the table.
Figure 5B:
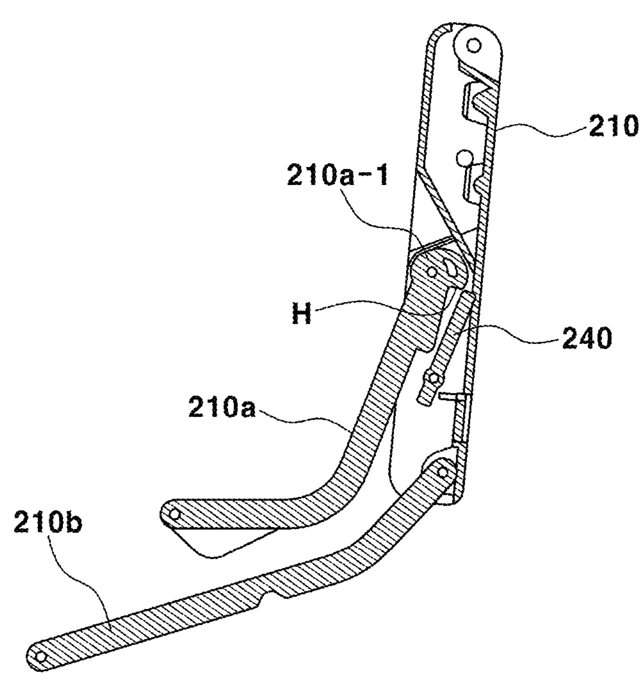
Figure 6:
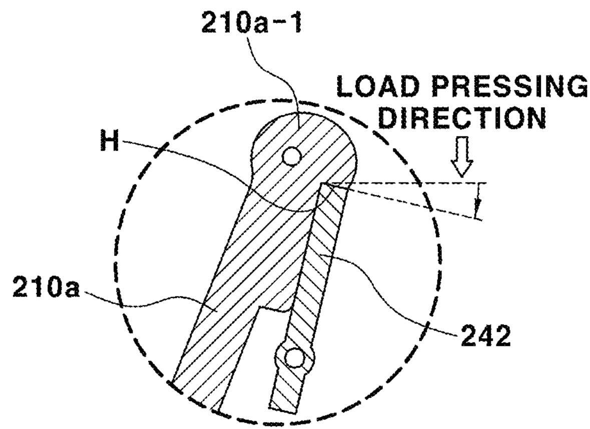
FIG. 6 is a view illustrating a latching member of a second locking link unit of the console table apparatus for a vehicle according to an embodiment of the present disclosure.

In addition, FIGS. 4A and 4B are views illustrating a structure of the second link module of the console table apparatus for a vehicle according to an embodiment of the present disclosure and for a table in an in use state. FIGS. 5A and 5B are views illustrating a structure of the second link module of the console table apparatus for a vehicle according to an embodiment of the present disclosure and for a table in a stored state. FIG. 6 is a view illustrating a latching member of a second locking link unit of the console table apparatus for a vehicle according to an embodiment of the present disclosure.

Figure 7:
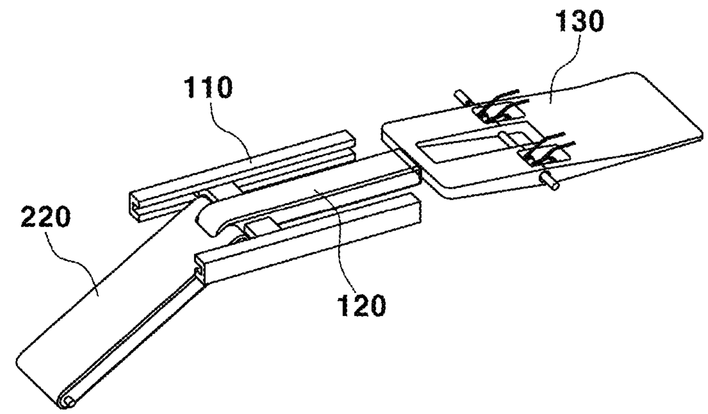
FIG. 7 is a view illustrating an assembled state of a first link module of the console table apparatus for a vehicle according to an embodiment of the present disclosure.
Figure 8:
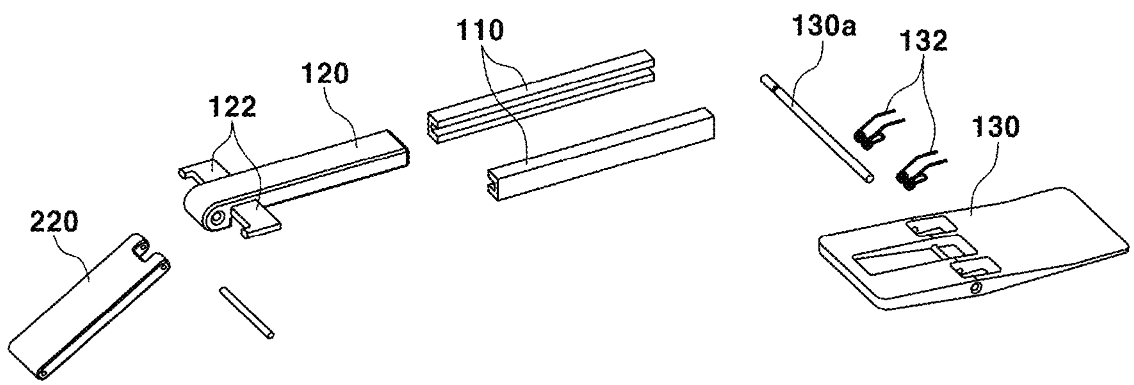
FIG. 8 is a view illustrating an exploded view of the first link module of the console table apparatus for a vehicle according to an embodiment of the present disclosure.

In addition, FIG. 7 is a view illustrating an assembled state of a first link module of the console table apparatus for a vehicle according to an embodiment of the present disclosure. FIG. 8 is a view illustrating an exploded view of the first link module of the console table apparatus for a vehicle according to an embodiment of the present disclosure.

Figure 9:
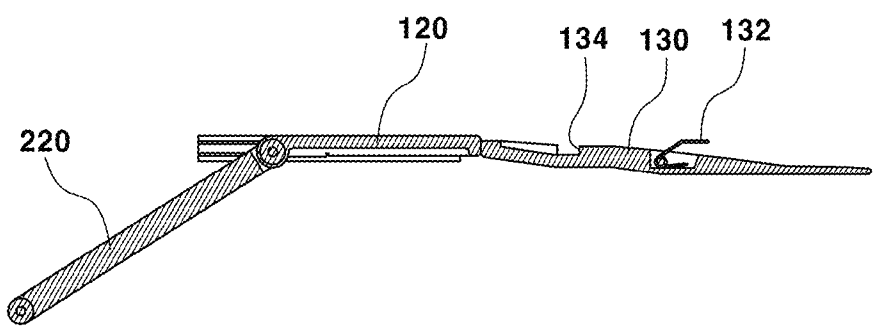
FIG. 9 is a view illustrating a structure of the first link module of the console table apparatus for a vehicle according to an embodiment of the present disclosure.
Figure 10A:
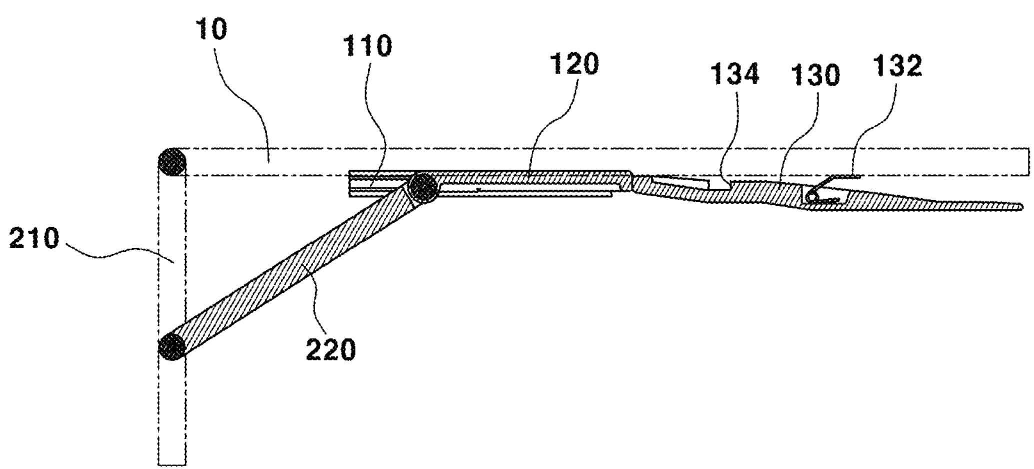
FIG. 10A is a view illustrating a structure of the first link module of the console table apparatus for a vehicle according to an embodiment of the present disclosure and in an in use state for the table.
Figure 10B:
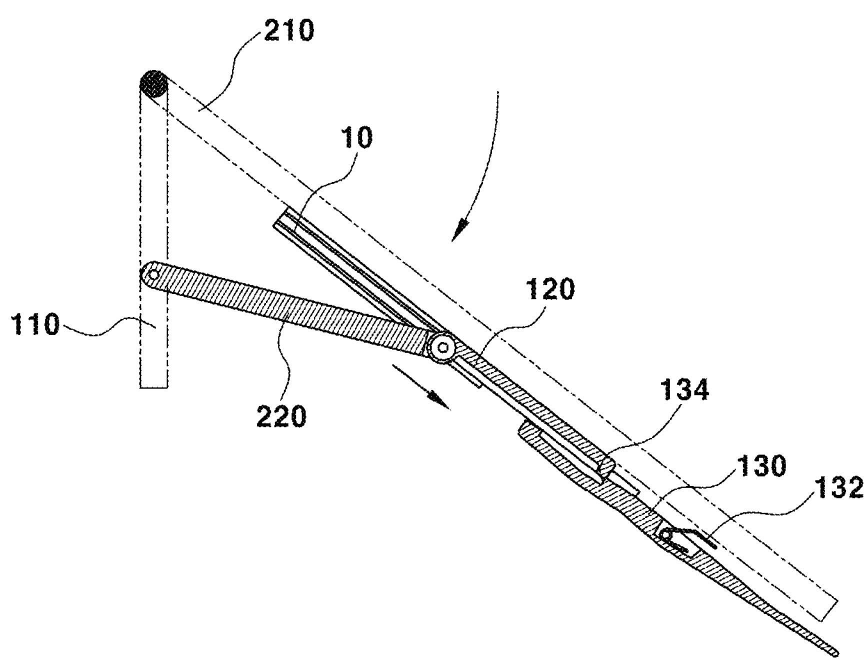
FIG. 10B is a view illustrating a structure of the first link module of the console table apparatus for a vehicle according to an embodiment of the present disclosure and in a stored state for the table.

In addition, FIG. 9 is a view illustrating a structure of the first link module of the console table apparatus for a vehicle according to an embodiment of the present disclosure. FIG. 10A is a view illustrating a structure of the first link module of the console table apparatus for a vehicle according to an embodiment of the present disclosure and for a table in an in use state. FIG. 10B is a view illustrating a structure of the first link module of the console table apparatus for a vehicle according to an embodiment of the present disclosure and for a table in a stored state.

In general, a table 10 is provided to be stored in a vehicle console 1 or the like. The table 10 may be fixed only when a separate locking device is operated in an in use state. Likewise, a locking device for releasing the fixed table also needs to be operated upon switching the table to a stored state.

As described above, when the table 10 is used, inconvenience may be given to a user in a first or second row of a vehicle upon manipulation since a separate locking device needs to be operated. Additionally, a plurality of components for the locking device are inevitably added, leading to increased structural complexity.

To this end, as illustrated in FIG. 1, the console table apparatus for a vehicle according to an embodiment includes a first link module 100 and a second link module 200.

The first link module 100 selectively slides along the table 10 when the table 10 is moved between a stored state and an in use state, i.e., in a state of being drawn out from the console 1 and capable of supporting a load. The first link module 100 including the table 10 is folded with the second link module 200 when switched to the stored state inside the console 1.

In addition, the second link module 200 supports the first link module 100. As the table 10 is switched to the stored state, a locking state for supporting the first link module 100 is selectively released in connection therewith and the table 10 and the second link module 200 may be stored inside the console 1 together with the first link module 100.

In other words, when an operation is performed that switches the first link module 100 from the in use state to the stored state, the second link module 200 may release the locking state fixing and supporting the first link module 100 in connection with the operation that switches the table 10 to the stored state even without operating a separate locking device.

Conversely, when an operation is performed switching from the stored state to the in use state, the second link module 200 may perform the locking for fixing and supporting the first link module 100 in connection with the operation that switches the table 10 to the in use state even without operating the separate locking device.

As illustrated in FIGS. 2 and 3, the second link module 200 may include a main bracket 210, a table link unit 220, a first locking link unit 230, and a second locking link unit 240.

The main bracket 210 is formed and configured to connect an upper link 210*a* and a lower link 210*b*. The upper link 210*a* is disposed on an upper portion of the main bracket 210 and extends from the console 1. The lower link 210*b* is disposed to be spaced apart from a lower portion of the upper link 210*a*.

The upper link 210*a* and the lower link 210*b* constrain a rotational trajectory of the main bracket 210 for switching the table 10 from an in use state to a stored state or from the stored state to the in use state. Additionally, the upper link 210*a* and the lower link 210*b* may be formed to be bent in consideration of and to accommodate a vehicle layout.

The table link unit 220 has one end rotatably mounted on the main bracket 210 and the other end connected to the first link module 100. Additionally, the table link unit 220 is formed and configured to selectively support the table 10 hingedly coupled (e.g., coupled via a pivot or hinge) to the main bracket 210 in the in use state.

As illustrated in FIG. 4A, the first locking link unit 230 is provided to have one end disposed to protrude inside the main bracket 210 to selectively rotate by being pressed by the table link unit 220.

A wedge-shaped pressing member 232 is disposed at the other end of the first locking link unit 230 to be in contact with the second locking link unit 240. As illustrated in FIG. 5A, the first locking link unit 230 selectively rotates in connection with the second locking link unit 240 by a shape of the pressing member 232 upon rotating.

Since the first locking link unit 230 has a shape in which the other end in contact with the second locking link unit 240 is gradually widened in a front-rear direction (see FIG. 3), the first locking link unit 230 enables the rotation of the second locking link unit 240 even upon rotating at a relatively small angle.

The first locking link unit 230 is coupled to the main bracket 210 together with an elastic member 234. As a result, an elastic restoring force acts to allow the first locking link unit 230 to return to an initial position when the rotation is performed by pressing the table link unit 220.

The second locking link unit 240 rotates in connection with the first locking link unit 230. The second locking link unit 240 is formed to be selectively released from the upper link 210*a* by rotating while overcoming the elastic restoring force applied to the second locking link unit 240 by the elastic member 246.

In other words, as illustrated in FIG. 4B, the second locking link unit 240 may be positioned to be latched to the upper link 210*a* through a pair of latching members 242 provided in a shape corresponding to a latching groove H formed in each of a pair of coupling portions 210*a*-1 of the upper link 210*a* (see FIG. 3). As described above, when the second locking link unit 240 is rotated by being pressed by the first locking link unit 230, as illustrated in FIG. 5B, the latching members 242 may be released from being latched or locked with the pair of coupling portions 210*a*-1 of the upper link 210*a*.

As described above, when the locking or latching in the latching groove H of the second locking link unit 240 is released, the upper link 210*a* and the lower link 210*b* may be rotated. As a result, the table 10 may be switched to the stored state to be stored inside the console 1.

The second locking link unit 240 may have a locking step 244 provided between the pair of latching members 242 at which the first locking link unit 230 is positioned (see FIG. 3). When the first locking link unit 230 rotates, the second locking link unit 240 may rotate in a direction that is pressed via the pressing of the locking step 244, thereby easily releasing the second locking link unit 240 latched to the latching grooves H.

As illustrated in FIG. 6, the latching members 242 may be formed to be inclined downward from a load pressing direction of the table 10 and positioned to be latched to the latching grooves H, respectively.

This is to prevent the locking or latching of the second locking link unit 240 from being released when in the in use state. This is achieved by forming an angle at which the latching grooves H and the latching members 242 are matched in the same direction as the load pressing direction or more, i.e., to be inclined downward. This is because the latching members 242 may move along an inclined surface in the in use state of the table 10 to be separated from the latching grooves H when the angle at which the latching grooves H and the latching members 242 are matched is formed in the load pressing direction or less.

As illustrated in FIGS. 7-9, the first link module 100 includes rail guides 110, a rail link unit 120, and a button unit 130.

A pair of the rail guides 110 have a predetermined length and are provided parallel to each other and fixedly coupled to a lower portion of the table 10 to form a slide movement path.

In addition, the rail link unit 120 is connected to the table link unit 220 of the second link module 200 and slidably coupled to the rail guide 110. As the table 10 is switched from the in use state to the stored state, the rail link unit 120 is formed and configured to slide in a longitudinal direction of the rail guide 110.

As illustrated in FIG. 8, the rail link unit 120 may include a wing member 122. As the wing member 122 is inserted into and slidably coupled to the rail guide 110, the rail link unit 120 may slide in a horizontal direction in parallel with the rail guide 110.

In addition, the button unit 130 is disposed collinearly with the rail link unit 120 to maintain a state of being in contact with the rail link unit 120. The button unit 130 is configured to block the slide movement of the rail link unit 120 so that the table 10 is fixed in the in use state.

The button unit 130 is axially and rotatably mounted on the table 10. When the button unit 130 is rotated by pressing upward, as the table 10 is switched to the stored state, the button unit 130 releases the contact state with the rail link unit 120 to extend the slide movement path.

More specifically, the button unit 130 is axially and rotatably mounted on the table 10 by a rotational shaft 130*a* coupled to the table 10. The button unit 130 is coupled to the table 10 together with the elastic member 132 so that the elastic restoring force acts to allow the button unit 130 to return to an initial position. Thus, as illustrated in FIG. 10A, the contact state with the rail link unit 120 may be effectively maintained. In this case, as illustrated in FIG. 10B, when one side of the button unit 130, i.e., the side or end opposite the rail link unit 120 is pressed, the button unit 130 rotates about the rotational shaft 130*a*. In doing so, the other side or end of the button 130 facing the rail link unit 120 moves down or way from the table 10. Thus, the contact state with the rail link unit 120 may be released to extend the slide movement path.

The slide movement path for the rail link unit 120 may extend along a space formed between the button unit 130 and the table 10, which moves down and away from the table 10 when the button unit 130 rotates. As described above, as the rail link unit 120 moves along the extended slide movement path, the table 10 including the first link module 100 may be folded while axially rotating toward the main bracket 210 of the second link module 200 and switched to the stored state.

The button unit 130 selectively extends the slide movement path and may include a movement guide, movement limiter, or stop 134 for restricting an additional slide movement of the rail link unit 120 in the space formed between the button unit 130 and the table 10.

This is to prevent a situation where the rail link unit 120 may be separated from the rail guide 110 when the rail link unit 120 continuously slides into the space formed between the button unit 130 and the table 10 without the movement guide 134.

As a result, in an embodiment, when the table 10 positioned in the in use state is intended to be switched to the stored state, the locking of the first link module 100 may be released by pressing the one end of the button unit 130 toward the table 10. Additionally, when the first link module 100 is folded to the second link module 200 together with the table 10, the table link unit 220 may press the first locking link unit 230 by such an operation so that the locking or latching with the upper link 210*a* is released through the second locking link unit 240. Therefore, the switching of the table 10 to the stored state may be done through the rotation of the upper link 210*a* and the lower link 210*b*.

As a result, in an embodiment, when the button unit 130 for switching to the stored state is pressed, the second link module 200 may perform the operation to the release the locking or latching in connection with the operation of the first link module 100. In addition, even when the table 10 is switched from the stored state to the in use state, the operations of the first link module 100 and the second link module 200 may be connected by only the operation of unfolding the table 10 so that the locking of the first link module 100 and the second link module 200 for supporting the table 10 in the in use state is performed automatically.

According to the present disclosure, by fixing or releasing the fixing of the locking link formed in the two-joint link structure in connection with the operation motion according to use or storage of the console table, it is possible to increase convenience of the user who fixes or releases the fixing of the console table. It is also not necessary to apply the separate button structure for this, thereby simplifying the configuration.

In addition, by applying a structure of the slide rail and the rail link moving along the slide rail and allowing the rail link to move, upon pressing of the button, to be received in the space between the button and the console table, the console table can be folded by releasing the fixing of the rail link and can be easily folded by only the pressing of the button. As a result, the configuration increases the user's convenience.

The present disclosure has been described above with reference to various embodiments shown in the drawings. However, it should be understood that this is only illustrative, and various modifications can be made to the present disclosure by those having ordinary skill in the art. All or some of the above-described embodiments may also be configured in selective combination thereof. Therefore, the true technical scope of the present disclosure should be determined by the technical spirit of the appended claims.

What is claimed is:

1. A console table apparatus for a vehicle, comprising:
- a first link module configured to selectively slide along a table when the table is drawn out from a console of the vehicle and positioned in an in use state and when the table is switched to a stored state; and
- a second link module configured to support the first link module in the in use state, and to selectively release a locking state as the table is switched to the stored state,
- wherein the second link module is stored inside the console together with the first link module, and
- wherein the second link module includes
  - a main bracket, and
  - an upper link and a lower link bent and extending from the console and connected to the main bracket.

2. The console table apparatus of claim 1, wherein the second link module further includes:
- a table link unit rotatably mounted on the main bracket and configured to be connected to the first link module to support the table in the in use state;
- a first locking link unit disposed to protrude inside the main bracket and configured to selectively rotate by being pressed by the table link unit; and
- a second locking link unit configured to be rotated by the first locking link unit and to be selectively released from a latching state of the upper link when the table is moved from the in use state to the stored state.

3. The console table apparatus of claim 2, wherein a wedge-shaped pressing member is positioned in contact with the second locking link unit, and wherein the first locking link unit allows the second locking link unit to be selectively rotated by a shape of the pressing member upon rotating.

4. The console table apparatus of claim 3, wherein the first locking link unit is coupled to the main bracket together with an elastic member so that an elastic restoring force acts to return the first locking link unit to an initial position.

5. The console table apparatus of claim 2, wherein the second locking link unit, in the in use state, is positioned by being latched to the upper link through a pair of latching members having shapes corresponding to a pair of latching grooves of the upper link.

6. The console table apparatus of claim 5, wherein the second locking link unit is coupled to the main bracket together with an elastic member so that an elastic restoring force acts to return the first locking link unit to an initial position.

7. The console table apparatus of claim 5, wherein the second locking link unit has a latching step between the pair of latching members at which the first locking link unit is positioned to be rotated by pressing the first locking link unit.

8. The console table apparatus of claim 5, wherein the pair of latching members is formed to be inclined downward from a load pressing direction of the table and positioned by being respectively latched to the pair of latching grooves.

9. The console table apparatus of claim 1, wherein the first link module includes:
- a rail guide coupled to the table to form a slide movement path;
- a rail link unit connected to the second link module and configured to slide along the rail guide as the table is switched to the stored state; and
- a button unit disposed collinearly with the rail link unit to maintain a contact state and configured to block part of the slide movement path of the rail link unit to fix the table in the in use state.

10. The console table apparatus of claim 9, wherein the button unit is rotatably mounted on the table and is configured to release the contact state allowing the table to be switched to the stored state upon rotating by pressing the button unit to extend the slide movement path.

11. The console table apparatus of claim 10, wherein the button unit is coupled to the table together with an elastic member so that an elastic restoring force acts to return the button unit to an initial position of the contact state.

12. The console table apparatus of claim 10, wherein the extended slide movement path extends along a space formed between the button unit and the table when the button unit is rotated by pressing.

13. The console table apparatus of claim 12, wherein the button unit extends the slide movement path and has a movement guide configured to restrict movement in the space.

* * * * *